United States Patent
Blum et al.

(10) Patent No.: US 6,803,393 B2
(45) Date of Patent: Oct. 12, 2004

(54) MULTICOMPONENT SYSTEM THAT CAN BE CURED THERMALLY OR BY ACTINIC RADIATION, METHOD FOR PRODUCING THE SAME AND THE USE THEREOF

(75) Inventors: Rainer Blum, Ludwigshafen (DE); Maxime Allard, Münster (DE)

(73) Assignee: BASF Coatings AG, Munster (DE)

( * ) Notice: Subject to any disclaimer, the term of this patent is extended or adjusted under 35 U.S.C. 154(b) by 138 days.

(21) Appl. No.: 10/297,884

(22) PCT Filed: Jul. 2, 2001

(86) PCT No.: PCT/EP01/07517

§ 371 (c)(1), (2), (4) Date: Dec. 11, 2002

(87) PCT Pub. No.: WO02/02704

PCT Pub. Date: Jan. 10, 2002

(65) Prior Publication Data

US 2003/0134929 A1 Jul. 17, 2003

(30) Foreign Application Priority Data

Jul. 1, 2000 (DE) .......................... 100 32 136

(51) Int. Cl.$^7$ ................ C08F 2/46; C08F 2/50
(52) U.S. Cl. ............ 522/107; 522/104; 522/93; 522/96; 522/106; 522/109; 522/110; 522/111; 522/120; 522/134; 522/135; 522/139; 522/144; 522/165; 522/174; 522/35; 522/902; 523/500
(58) Field of Search ............ 522/35, 90, 93, 522/96, 104, 106, 107, 109, 110, 111, 120, 134, 135, 139, 144, 165, 174, 902; 523/500

(56) References Cited

U.S. PATENT DOCUMENTS

| | | | | |
|---|---|---|---|---|
| 4,546,129 A | * | 10/1985 | Hefner, Jr. | .................. 523/456 |
| 5,620,751 A | * | 4/1997 | Brindoepke et al. | ........ 427/506 |
| 5,684,086 A | * | 11/1997 | Yang et al. | .................... 525/49 |
| 6,133,337 A | * | 10/2000 | Blum et al. | ................. 522/104 |
| 6,228,146 B1 | * | 5/2001 | Kuespert | ...................... 95/46 |
| 6,541,535 B1 | * | 4/2003 | Blum et al. | ................... 522/35 |

FOREIGN PATENT DOCUMENTS

| | | | | |
|---|---|---|---|---|
| CA | 2 258 813 | 1/1999 | ......... | C09D/175/14 |
| WO | WO 97 25724 | 7/1997 | ............ | H01B/3/42 |

OTHER PUBLICATIONS

BASF Corporation et al., USSN 09/890,019, filed Sep. 9, 2001, pp. 1–52, and Abstract 1–2.
BASF Corporation et al., USSN 10/018,106, filed Jan. 11, 2002, pp. 1–36, and Abstract.

* cited by examiner

Primary Examiner—James J. Seidleck
Assistant Examiner—Sanza L. McCledon

(57) ABSTRACT

Multicomponent system curable thermally and with actinic radiation, comprising A) an isocyanate-reactive binder comprising A1) at least one unsaturated polyester whose molecule contains on average at least one group that can be activated with actinic radiation, of the formulae I, II and/or III

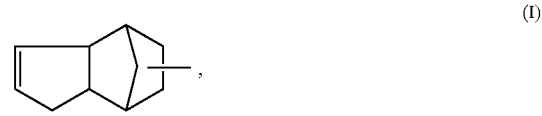

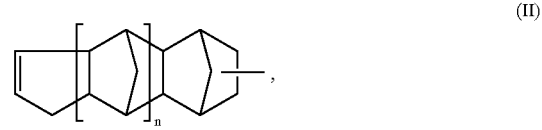

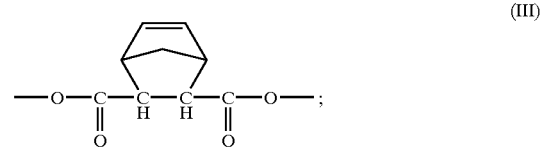

wherein n is an integer from 1 to 10; and A2) at least one binder, different than (A1), whose molecule comprises on average at least two isocyanate-reactive functional groups, and/or A3) at least one binder, different than (A1), whose molecule comprises on average at least one isocyanate-reactive functional group and at least one reactive functional group having at least one bond that can be activated with actinic radiation, and B) a crosslinker comprising B1) at least one polyisocyanate and/or B2) at least one polyisocyanate whose molecule comprises on average at least one reactive functional group having at least one bond that can be activated with actinic radiation.

12 Claims, No Drawings

MULTICOMPONENT SYSTEM THAT CAN BE CURED THERMALLY OR BY ACTINIC RADIATION, METHOD FOR PRODUCING THE SAME AND THE USE THEREOF

This application is a National Phase Application of Patent Application PCT/EP01/07517 filed on 2 Jul. 2001.

The present invention relates to a novel multicomponent system curable thermally and with actinic radiation. The present invention further relates to a process for producing the novel multicomponent system curable thermally and with actinic radiation. The present invention additionally relates to the use of the novel multicomponent system curable thermally and with actinic radiation for priming plastics parts.

The coating of plastics parts is becoming increasingly important, especially in the motor vehicle industry. Here, a segment showing particularly rapid growth is that of mounted plastics components. However, the coating of plastics still causes great problems, brought about in particular by the variable surface smoothness of the plastics parts, the adhesion of coatings to different plastics surfaces, and the formation of gas bubbles and holes in the coatings on curing.

In order to solve these problems, it is common to apply special primers intended to compensate the unevennesses of the plastics surfaces and ensure that the coatings adhere to the plastics surfaces. For this purpose it is common to use what are known as multicomponent systems, where owing to its high reactivity the crosslinker component is stored separately from the binder component prior to application. Examples of such multicomponent systems are those are known as polyurethane systems, where the binding component comprises isocyanate-reactive functional groups and the crosslinker component comprises polyisocyanates.

The disadvantage of these multicomponent systems is their comparatively long reaction time, unacceptable especially in OEM automotive finishing. Although the reaction time could be shortened by applying heat, to do so would reintroduce the problem of formation of bubbles. The surface defects caused by the gas bubbles in the primers would then have to be made good by sanding, which is laborious and expensive.

Multicomponent systems curable thermally and with actinic radiation, and their use as coating materials, are known, for example, from European Patent Application EP 0 928 800 A1. The known coating materials comprise a urethane (meth)acrylate, containing (meth)acrylate groups and free isocyanate groups, a UV initiator which initiates free-radical polymerization (photoinitiator), and an isocyanate-reactive compound. Suitable isocyanate-reactive compounds include polyols such as polyesters formed from diols and triols with dicarboxylic acids, hindered amines formed from maleic esters and cycloaliphatic primary diamines, polyether polyols, or hydroxyl-containing (meth) acrylate copolymers. The priming of plastics parts is not addressed in the European Patent Application.

German Patent Application DE 199 20 799, unpublished at the priority date of the present specification, describes a multicomponent system curable thermally and with actinic radiation. As its binder component it comprises a hydroxyl-free polyurethane having pendant acrylate groups, and a polyester polyol, and as its crosslinking component, a polyisocyanate containing acrylate groups. The multicomponent system is used to seal sheet molded compounds (SMC) and bulk molded compounds (BMC). There is no use, however, of any crosslinker components or binder components which include dicyclopentadienyl groups and/or endomethylenetetrahydrophthalic acid groups.

German Patent Application DE 199 03 725, unpublished at the priority date of the present specification, describes a coating material comprising an essentially hydroxyl-free, unsaturated polyester having dicyclopentadienyl groups and/or endomethylenetetrahydrophthalic acid groups and a hydroxyl-free polymer, materially different from the polyester, which may include the aforementioned groups. It is mentioned in passing in the application that the coating material may be cocrosslinked with polyisocyanates. Details of how this is to be done are not given. Moreover, the known coating material is said to be used in particular as a powder coating material.

It is an object of the present invention to find a new multicomponent system, curable thermally and with actinic radiation, from which the disadvantages of the prior art are now absent and which instead is easy to apply, leads rapidly and reliably at comparatively low temperatures to coatings, especially primer coats on plastics parts, which are free from surface defects such as bubbles and cracks, provide outstanding compensation of unevennesses in plastics surfaces, and exhibit excellent adhesion to the plastics surfaces and to coatings applied to the primer coats.

We have found that this object is achieved by the novel multicomponent system, curable thermally and with actinic radiation, which comprises the following components:

A) an isocyanate-reactive binder component comprising
   A1) at least one unsaturated polyester whose molecule contains on average at least one group that can be activated with actinic radiation, of the formulae I, II and/or III

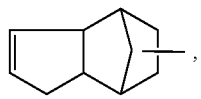 (I)

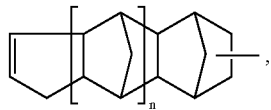 (II)

in which the index n is an integer from 1 to 10;

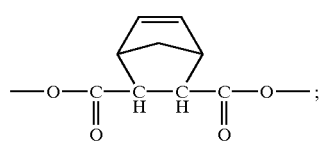 (III)

and

A2) at least one binder, different than the polyester (A1), whose molecule comprises on average at least two isocyanate-reactive functional groups, and/or A3) at least one binder, different than the polyester (A1), whose molecule comprises on average at least one isocyanate-reactive functional group and at least one reactive functional group having at least one bond that can be activated with actinic radiation, and B) a crosslinker component comprising
   B1) at least one polyisocyanate and/or
   B2) at least one polyisocyanate whose molecule comprises on average at least one reactive functional group having at least one bond that can be activated with actinic radiation.

In the text below, the novel multicomponent system curable thermally and with actinic radiation is referred to as the "multicomponent system of the invention".

Further subject matter of the invention will emerge from the description.

In the light of the prior art it was surprising and unforeseeable by the skilled worker that the object on which the present invention is based might be achieved with the aid of the multicomponent system of the invention. A particular surprise was that the multicomponent system of the invention, following its preparation, i.e., after the mixing of its components, had a processing time or pot life which is long for multicomponent systems, and nevertheless, following application, cured rapidly at comparatively low temperatures without any risk of bubbles being formed.

In the context of the present invention, actinic radiation is electromagnetic radiation such as near infrared (NIR), visible light or UV light or corpuscular radiation such as electron beams.

Curing with heat and actinic radiation is referred to below using the term commonly employed in the art, namely "dual cure".

At the time of application, the multicomponent system of the invention may be present in a variety of physical forms. For instance, it may be in the form of an aqueous solution or dispersion, an organic solution or dispersion, an essentially water- and solvent-free, liquid 100% system, an essentially water- and solvent-free, finely divided, solid powder coating material, or a powder coating dispersion (powder slurry). It is of advantage in accordance with the invention if the multicomponent system of the invention is in the form of a liquid 100% system.

The first essential constituent of the multicomponent system of the invention is at least one isocyanate-reactive binder component (A) which comprises at least one unsaturated polyester (A1) and at least one binder (A2) and/or (A3) different than the polyester (A1).

In the context of the present invention, the term binder refers to oligomeric and polymeric resins, the oligomeric resins normally containing on average from 3 to 15 monomer units and the polymeric resins normally contain on average more than 10, in particular more than 15, monomer units per molecule.

The unsaturated polyester (A1) contains on average at least one, preferably at least two, group(s) of the formulae I, II and/or III that can be activated with actinic radiation. Preferably, the groups I and II are incorporated into the unsaturated polyesters (A1) by way of the following starting compounds IV to VIII:

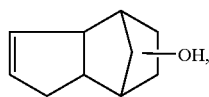

(IV)

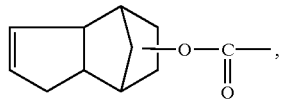

(V)

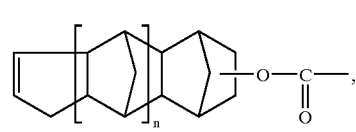

(VI)

in which the index n is as defined above,

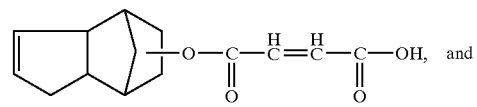

(VII)

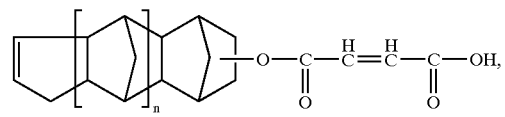

(VIII)

in which the index n is as defined above.

Preferred and easily obtainable are the esterlike dicyclopentadienyl (DCPD) adducts with polycarboxylic acids, as symbolized by the formulae V and VI. As a special case of these DCPD adducts there result adducts of maleic anhydride and water with DCPD, of the formulae VII and VIII. The use of such adducts produces particularly preferred unsaturated polyesters (A1). Moreover, dihydrodicyclopentadienol IV is available commercially and may be used in the synthesis of the polyesters (A1), thereby likewise introducing the structural units I and II.

Where the polyesters (A1) contain double bonds in the polymer chain, e.g., as maleic or fumaric esters, grafting with cyclopentadiene produces endomethylenetetrahydrophthalic acid structures III.

Examples of further suitable starting compounds for the preparation of the polyesters (A1) are the following:

adipic acid, suberic acid, phthalic acid isomers, tetrahydrophthalic acid, endomethylenetetrahydrophthalic acid, hexahydrophthalic acid, fumaric acid, maleic acid, itaconic acid, citraconic acid, trimellitic acid or pyromellitic acid;

ethylene glycol, polyethylene glycols, propylene glycol, polypropylene glycols, butanediol isomers, hexanediol, neopentyl glycol, trimethylolpropane, glycerol, pentaerythritol, bisphenol A or hydrogenated bisphenol A;

OH-polyfunctional polymers such as hydroxyl-modified polybutadienes or hydroxyl-bearing polyurethane prepolymers and epoxy resins;

polyfunctional natural substances or derivatives thereof, such as linseed oil fatty acid, dimeric and polymeric linseed oil fatty acid, castor oil, castor oil fatty acid; and/or alkoxylated hydroxy-functional compounds such as the ethoxylation and propoxylation products of the above-mentioned polyols.

Furthermore, the introduction of amide and imide structures into polyesters (A1), in accordance with the patent applications DE 157 0 273 A1 and DE 172 0 323 A1 is also known prior art.

The introduction of the structural units I and/or II takes place preferably through the use of the above-described acidic esters V to VIII, especially VII and VIII, in the polycondensation.

A further possibility is to prepare polyesters (A1) with an excess of acid and then to react them with DCPD. A high degree of conversion generally necessitates the use of catalysts, an example being boron trifluoride etherate. At relatively high temperatures and pressure, oligo-DCPD structures (structural unit II) are also formed.

Where the polyesters (A1) in this reaction contain double bonds in the polymer chain, e.g., as maleic or fumaric esters, grafting with cyclopentadiene produces endomethylenetetrahydrophthalic acid structures VIII.

Also of particular importance are polyesters (A1) in accordance with patent application DE 43 21 533 A1, which are obtained using hydroxy-functional allyl ethers and have a particularly high photosensitivity. Also of importance of polyesters (A1) whose carboxyl groups that have remained free during the polycondensation are reacted with unsaturated epoxide compounds, preferably glycidyl (meth) acrylate; this measure, too, increases the photosensitivity.

The incorporation of photoinitiator groups II into the polyesters (A1) is possible, for example, by using benzophenonetetracarboxylic acid, benzophenonetetracarboxylic anhydride or benzophenonetetracarboxylic esters or 4-hydroxybenzophenone in the polycondensation. It is preferred in this case first to prepare hydroxyl-terminated polyester precursors, using an excess of hydroxyl compounds, and to react these precursors with benzophenonetetracarboxylic anhydride. In the course of this reaction, the benzophenone structures are incorporated in chain positions into the polyesters (A1) and carboxyl groups are produced. It is likewise preferred then to react these carboxyl groups with unsaturated epoxy compounds, preferably glycidyl (meth)acrylate.

The synthesis of the polyesters (A1), which satisfies specific requirements in respect, for example, of hardness, elasticity, viscosity or softening point, takes place in accordance with rules known to the skilled worker, through selection of the structural components and establishment of the degree of condensation. For preparing the polyesters (A1) it is generally possible to employ the apparatus and techniques described in detail in the standard work Ullmanns Encyklopädie der technischen Chemie, 3rd Edition, Volume 14, Urban & Schwarzenberg, Munich, Berlin, 1963, pages 80 to 89 and pages 99 to 105, and in the following books: "Résines Alkydes-Polyesters" by J. Bourry, Paris, Dunod, 1952, "Alkyd Resins" by C. R. Martens, Reinhold Publishing Corporation, New York, 1961, and "Alkyd Resin Technology" by T. C. Patton, Interscience Publishers, 1962.

The polyester (A1) may be prepared with an excess of polyols, so that it has free hydroxyl groups. Alternatively, the polyols and the polycarboxylic acids may be present in a stoichiometric ratio in respect of the hydroxyl groups or carboxyl groups, except that they are not condensed to completion, so that there are still free hydroxyl groups and carboxyl groups. This has the advantage that the polyesters (A1) as well are able to participate in the thermal crosslinking with the isocyanate groups of component (B) (dual cure).

The polyesters (A1) preferably have a hydroxyl number of from 20 to 200, in particular from 30 to 120 mg KOH/g.

The proportion of the polyesters (A1) in the multicomponent systems of the invention may vary very widely. It is preferably from 1 to 60, more preferably from 2 to 55, with particular preference from 3 to 50, with very particular preference from 4 to 45, and in particular from 5 to 40% by weight, based in each case on the solids of the multicomponent system of the invention.

In the context of the present invention, here and below, the term "solids" refers to that fraction of the multicomponent system of the invention that remains as solids in the primer of the invention after curing.

The isocyanate-reactive binder component (A) further comprises at least one binder (A2), which is different than the polyester (A1) and whose molecule comprises on average at least one, in particular at least two, isocyanate-reactive functional group(s).

Instead of the binder (A2) or in addition to it, the isocyanate-reactive binder component (A) comprises at least one binder (A3) which is different than the polyester (A1) and whose molecule comprises on average at least one, in particular at least two, isocyanate-reactive functional group (s) and at least one, in particular at least two, reactive functional group(s) having at least one bond that can be activated with actinic radiation. In the text below the reactive functional groups having at least one bond that can be activated with actinic radiation are referred to for the sake of brevity as "radiation-active groups".

The binders (A3) are of advantage in accordance with the invention since they may be cured by the dual cure mechanism.

The binders (A2) and (A3) comprise the same oligomeric or polymeric parent structures, as are described below.

Examples of suitable isocyanate-reactive functional groups are hydroxyl groups, primary and secondary, especially primary, amino groups and/or thiol groups. Of these, hydroxyl groups are of particular advantage and are therefore used with preference in accordance with the invention.

In the context of the present invention, a bond that can be activated with actinic radiation is a bond which on exposure to actinic radiation becomes reactive and, with other activated bonds of its kind, enters into addition polymerization reactions and/or crosslinking reactions which proceed in accordance with free-radical and/or ionic mechanisms. Examples of suitable bonds are carbon-hydrogen single bonds or carbon-carbon, carbon-oxygen, carbon-nitrogen, carbon-phosphorus or carbon-silicon single bonds or double bonds. Of these, the carbon-carbon double bonds are particularly advantageous and are therefore used with very particular preference in accordance with the invention. For the sake of brevity, they are referred to below as "double bonds".

Accordingly, the radiation-active group which is preferred in accordance with the invention contains one double bond or two, three or four double bonds. Where more than one double bond is used, the double bonds may be conjugated. In accordance with the invention, however, it is of advantage if the double bonds are present in isolation, in particular each being present terminally, in the radiation-active group. It is of advantage in accordance with the invention to use two double bonds and of particular advantage to use one double bond.

Furthermore, the binders (A3) contain on average at least one, in particular at least two, radiation-active group(s). The functionality chosen is guided on the one hand by the stoichiometric ratios of the starting products of the binders (A3), which on the other hand are guided again by their intended applications.

Where on average more than one radiation-active group per molecule is used, the at least two radiation-active groups are structurally different from one another or of the same structure.

If they are structurally different from one another, this means in the context of the present invention that two, three, four or more, but especially two, radiation-active groups are used which derive from two, three, four or more, but especially two, monomer classes.

Examples of suitable radiation-active groups are (meth) acrylate, ethacrylate, crotonate, cinnamate, vinyl ether, vinyl ester, dicyclopentadienyl, norbornenyl, isoprenyl, isopropenyl, allyl or butenyl groups; dicyclopentadienyl, norbornenyl, isoprenyl, isopropenyl, allyl or butenyl ether groups, or dicyclopentadienyl, norbornenyl, isoprenyl, isopropenyl, allyl or butenyl ester groups, but especially acrylate groups.

The radiation-active groups are attached to the parent structure of the binder (A3) by way of urethane, urea, allophanate, ester, ether and/or amide groups. Urethane groups are particularly preferred. Suitable structures for this purpose are the following two linking structures IX and X:
Parent structure-NH—C(O)—O-radiation-active group (IX), and
Parent structure-O—(O)C—NH-radiation-active group (X).

Both linking structures IX and X or only one of them may be present in the binder (A3). In general, the structure IX is of advantage, owing to the larger number of available starting materials and their comparatively greater ease of preparation, and is therefore employed with preference in accordance with the invention.

The radiation-active groups are attached terminally and/or laterally to the parent structure. The type of attachment chosen is guided in particular by whether the reactive functional groups in the parent structure with which the starting materials of the radiation-active groups are able to react are located laterally or terminally. Owing to the lack of steric screening, terminal radiation-active groups frequently have a higher reactivity than lateral radiation-active groups and are therefore used with preference. On the other hand, however, the reactivity of the binder (A3) may be tailored by way of the proportion of terminal and lateral radiation-active groups, which is a further particular advantage of the multicomponent system of the invention.

The parent structure of the binders (A2) and (A3) is oligomeric and/or polymeric. In other words, the binders (A2) and (A3) are oligomers or polymers or mixtures thereof.

The oligomeric or polymeric parent structure contains or comprises aromatic, cycloaliphatic and/or aliphatic structures or structural units. Preferably, it contains or comprises cycloaliphatic and/or aliphatic structures, especially cycloaliphatic and aliphatic structures.

Examples of suitable aromatic structures are aromatic and heteroaromatic rings, especially benzene rings.

Examples of cycloaliphatic structures are cyclobutane, cyclopentane, cyclohexane, cycloheptane, norbornane, camphane, cyclooctane or tricyclodecane rings, especially cyclohexane rings.

Examples of aliphatic structures are linear or branched alkyl chains having 2 to 20 carbon atoms, or chains as result from the (co)polymerization of olefinically unsaturated monomers.

The parent structure may further comprise olefinically unsaturated double bonds.

The parent structure may further comprise chemically bonded stabilizers. If used, they are present in the binder (A3) in an amount of from 0.01 to 1.0 mol %, preferably from 0.02 to 0.9 mol %, more preferably from 0.03 to 0.85 mol %, with particular preference from 0.04 to 0.8 mol %, with very particular preference from 0.05 to 0.75 mol %, and in particular from 0.06 to 0.7 mol %, based in each case on the double bonds present in the binder (A3).

The chemically bonded stabilizer comprises compounds which are or which denote sterically hindered nitroxyl radicals (>N—O.) which scavenge free radicals in the modified Denisov cycle.

Examples of suitable chemically bonded stabilizers are HALS compounds, preferably 2,2,6,6-tetraalkylpiperidine derivatives, especially 2,2,6,6-tetramethylpiperidine derivatives, whose nitrogen atom is substituted by an oxygen atom, alkyl group, alkyl carbonyl group or alkyl ether group. For further details, reference is made to the textbook "Lackadditive" [Coatings additives] by Johan Bieleman, Wiley-VCH, Weinheim, N.Y., 1998, pages 293 to 295.

Examples of suitable starting materials for introducing the chemically bonded stabilizers are HALS compounds, preferably 2,2,6,6-tetraalkylpiperidine derivatives, especially 2,2,6,6-tetramethylpiperidine derivatives, whose nitrogen atom is substituted by oxygen atom, alkyl group, alkylcarbonyl group or alkyl ether group and which contain an isocyanate group or an isocyanate-reactive functional group, especially a hydroxyl group. An example of a particularly suitable starting material is the nitroxyl radical 2,2,6,6-tetramethyl-4-hydroxypiperidine N-oxide.

The parent structure is linear, branched, hyperbranched or dendrimeric in structure.

It may contain multivalent, especially divalent, functional groups by means of which the above-described structures and/or structural units are linked with one another to the parent structure. These groups are generally selected such that they do not disrupt, or even prevent entirely, the reactions initiated by the actinic radiation. Examples of suitable functional groups are ether, thioether, carboxylic ester, thiocarboxylic ester, carbonate, thiocarbonate, phosphoric ester, thiophosphoric ester, phosphonic ester, thiophosphonic ester, phosphite, thiophosphite, sulfonic ester, amide, amine, thioamide, phosphoramide, thiophosphoramide, phosphonamide, thiophosphonamide, sulfonamide, imide, urethane, hydrazide, urea, thiourea, carbonyl, thiocarbonyl, sulfone, sulfoxide or siloxane groups. Of these groups, the ether, carboxylic ester, carbonate, carboxamide, urea, urethane, imide and carbonate groups, especially the carboxylic ester and the urethane groups, are of advantage and are therefore used with preference.

Advantageous oligomeric and polymeric parent structures are derived, therefore, from random, alternating and/or block, linear, branched, hyperbranched, dendrimeric and/or comb addition (co)polymers of ethylenically unsaturated monomers, polyaddition resins and/or polycondensation resins. For further details of these terms, reference is made to Römpp Lexikon Lacke und Druckfarben, Georg Thieme Verlag, Stuttgart, New York, 1998, page 457, "Polyaddition" and "Polyaddition resins (Polyadducts)", and pages 463 and 464, "Polycondensates", "Polycondensation", and "Polycondensation resins".

Examples of suitable addition (co)polymers are poly (meth)acrylates and partially hydrolyzed polyvinyl esters.

Examples of suitable polyaddition resins and/or polycondensation resins are polyesters, alkyds, polyurethanes, polyester-polyurethanes, polylactones, polycarbonates, polyethers, polyester-polyethers, epoxy resin-amine adducts, polyureas, polyamides or polyimides. Of these, the polyurethanes and polyester-polyurethanes are particularly advantageous and are therefore used with very particular preference in accordance with the invention.

The method of preparing the polyurethanes and polyester-polyurethanes used with preference in accordance with the invention has no special features but instead takes place with the aid of the apparatus and techniques customary and known in this field. Suitable methods and apparatus are described in detail, for example, in the patent applications EP 0 089 497 A1, EP 0 228 003 A1, EP 0 354 261 A1, EP 0 422 357 A1, EP 0 424 705 A1 or EP 0 299 148 A1.

The amount of the binders (A2) and/or (A3) in the multicomponent systems of the invention may also vary very widely. Preferably it is from 1 to 50, more preferably from 2 to 45, with particular preference from 3 to 40, with very particular preference from 4 to 35, and in particular from 5 to 30% by weight, based in each case on the solids of the multicomponent system of the invention.

Furthermore, the isocyanate-reactive binder component (A) may additionally comprise at least one further additive.

Additives suitable in particular for use in liquid 100% systems are reactive diluents curable thermally and reactive diluents that can be activated with actinic radiation.

Where used, the reactive diluents curable thermally are present in the isocyanate-reactive binder component (A), whereas the reactive diluents than can be activated with actinic radiation may be present both in the isocyanate-reactive binder component (A) and in the crosslinker component (B). Preferably, they are present in the binder component (A).

The two types of reactive diluent may also act as solvents and/or dispersants for the other constituents of the multicomponent systems of the invention.

Examples of suitable reactive diluents curable thermally are positionally isomeric diethyloctanediols or hydroxyl-containing hyperbranched compounds or dendrimers, as described in patent applications DE 198 09 643 A1, DE 198 40 605 A1 or DE 198 05 421 A1.

Examples of suitable reactive diluents curable by actinic radiation are those described under the headword "Reactive diluents" in Römpp Lexikon Lacke und Druckfarben, Georg Thieme Verlag, Stuttgart, New York, 1998, on page 491. Also suitable are vinylaromatic compounds, especially styrene.

The proportion of the reactive diluents in the multicomponent systems of the invention may vary very widely and is guided in particular by the reactivity which the multicomponent systems are intended to have. They are preferably present in the multicomponent systems of the invention in an amount of from 5 to 70, preferably from 6 to 60, with particular preference from 7 to 55, with very particular preference from 8 to 50, and in particular from 9 to 45% by weight, based in each case on the solids of the multicomponent system of the invention.

Otherwise, the isocyanate-reactive binder component (A) for use in accordance with the invention may comprise color and/or effect pigments and/or electrically conductive pigments, organic and inorganic, transparent or opaque, electrically conductive or nonconductive fillers, nanoparticles, low-boiling organic solvents and high-boiling organic solvents ("long solvents"), UV absorbers, light stabilizers, free-radical scavengers, thermally labile free-radical initiators, additional crosslinking agents, photoinitiators and photo-coinitiators, additional binders, thermal crosslinking catalysts, devolatilizers, slip additives, polymerization inhibitors, defoamers, emulsifiers, wetting agents, dispersants, adhesion promoters, leveling agents, film-forming auxiliaries, sag control agents (SCAs), rheology control additives (thickeners), flame retardants, siccatives, dryers, antiskinning agents, corrosion inhibitors, waxes, flatting agents, and precursors of organically modified ceramic materials or additional binders.

Examples of suitable effect pigments and/or electrically conductive pigments are metal flake pigments such as commercial aluminum bronzes, aluminum bronzes chromated in accordance with DE 36 36 183 A1, and commercial stainless steel bronzes, and also nonmetallic effect pigments, such as pearlescent pigments and interference pigments, for example. For further details, reference is made to Römpp Lexikon Lacke und Druckfarben, Georg Thieme Verlag, 1998, page 176, "Effect pigments" and pages 380 and 381, "Metal oxide-mica pigments" to "Metal pigments".

Examples of suitable inorganic color pigments and/or electrically conductive pigments are titanium dioxide, iron oxides, Sicotrans yellow, and carbon black. Examples of suitable organic color pigments are thioindigo pigments, indanthrene blue, Cromophthal red, Irgazine orange and Heliogen green. For further details, reference is made to Römpp Lexikon Lacke und Druckfarben, Georg Thieme Verlag, 1998, pages 180 and 181, "Iron blue pigments" to "Black iron oxide", pages 451 to 453, "Pigments" to "Pigment volume concentration", page 563, "Thioindigo pigments", and page 567, "Titanium dioxide pigments".

For the multicomponent systems of the invention it is of advantage to use electrically conductive pigments such as titanium dioxide/tin oxide pigments, since by this means the multicomponent systems of the invention may be applied by means of electrostatic spray application (ESTA).

Examples of suitable organic and inorganic fillers are chalk, dolomite calcium sulfates, barium sulfates, silicates such as talc or kaolin, mica, silicas, oxides such as aluminum hydroxide or magnesium hydroxide, or organic fillers such as textile fibers, cellulose fibers, polyethylene fibers, or wood flour. For further details, reference is made to Römpp Lexikon Lacke und Druckfarben, Georg Thieme Verlag, 1998, pages 250 ff., "Fillers".

For the multicomponent systems of the invention it is of advantage to use mixtures of platelet-shaped inorganic fillers such as talc or mica and nonplatelet-shaped inorganic fillers such as chalk, dolomite calcium sulfates, or barium sulfate, since by this means the viscosity and rheology may be established very effectively.

Furthermore, it is of advantage for the multicomponent systems of the invention to use the fillers, or a fraction of the fillers, in the form of a dispersion in reactive diluents curable with actinic radiation.

Examples of suitable additional crosslinking agents are amino resins, as described, for example, in Römpp Lexikon Lacke und Druckfarben, Georg Thieme Verlag, 1998, page 29, "Amino resins", in the textbook "Lackadditive" by Johan Bieleman, Wiley-VCH, Weinheim, New York, 1998, pages 242 ff., in the book "Paints, Coatings and Solvents", second, completely revised edition, Edit. D. Stoye and W. Freitag, Wiley-VCH, Weinheim, New York, 1998, pages 80 ff., in patents U.S. Pat. No. 4,710,542 A1 or EP-B-0 245 700 A1, and in the article by B. Singh and coworkers, "Carbamylmethylated Melamines, Novel Crosslinkers for the Coatings Industry" in Advanced Organic Coatings Science and Technology Series, 1991, Volume 13, pages 193 to 207; carboxyl-containing compounds or resins, as described, for example, in patent DE 196 52 813 A1; resins or compounds containing epoxide groups, as described, for example, in patents EP 0 299 420 A1, DE 22 14 650 B1, DE 27 49 576 B1, U.S. Pat. Nos. 4,091,048 A1 and 3,781,379 A1; blocked polyisocyanates, as described, for example, in patents U.S. Pat. No. 4,444,954 A1, DE 196 17 086 A1, DE 196 31 269 A1, EP 0 004 571 A1 and EP 0 582 051 A1; and/or tris(alkoxycarbonylamino)triazines, as described in patents U.S. Pat. Nos. 4,939,213 A1, 5,084,541 A1, 5,288,865 A1 and EP 0 604 922 A1.

Examples of suitable low-boiling organic solvents and high-boiling organic solvents ("long solvents") are ketones such as methyl ethyl ketone or methyl isobutyl ketone, diols such as butylglycol, esters such as ethyl acetate, butyl acetate or butyl glycol acetate, ethers such as dibutyl ether or ethylene glycol, diethylene glycol, propylene glycol, dipropylene glycol, butylene glycol or dibutylene glycol dimethyl, diethyl or dibutyl ether, N-methylpyrrolidone or xylenes or mixtures of aromatic hydrocarbons such as Solventnaphtha® or Solvesso®.

Examples of suitable thermally labile free-radical initiators are organic peroxides, organic azo compounds or C—C-cleaving initiators such as dialkyl peroxides, peroxocarboxylic acids, peroxodicarbonates, peroxide esters, hydroperoxides, ketone peroxides, azodinitriles, or benzpinacol silyl ether.

Examples of suitable crosslinking catalysts are dibutyltin dilaurate, lithium decanoate, oleate and/or stearate, or zinc octoate.

Examples of suitable photoinitiators and coinitiators are described in Römpp Lexikon Lacke und Druckfarben, Georg Thieme Verlag, Stuttgart, 1998, pages 444 to 446.

The additional binders differ structurally from the binders (A1), (A2) and (A3). Examples of suitable additional binders are oligomeric and polymeric, linear and/or branched and/or block, comb and/or random addition (co)polymers of ethylenically unsaturated monomers, or polyaddition resins and/or polycondensation resins, such as poly(meth)acrylates or acrylate copolymers, polyesters, alkyds, acrylated polyesters, polylactones, polycarbonates, polyethers, epoxy resin-amine adducts, (meth)acrylate diols, partially hydrolyzed polyvinyl esters, polyurethanes and acrylated polyurethanes, polyester-polyurethanes or polyureas.

Examples of suitable devolatilizers are diazadicycloundecane and benzoin.

Examples of suitable emulsifiers are nonionic emulsifiers, such as alkoxylated alkanols and polyols, phenols and alkylphenols, or anionic emulsifiers such as alkali metal salts or ammonium salts of alkane carboxylic acids, alkanesulfonic acids and sulfo acids of alkoxylated alkanols and polyols, phenols and alkylphenols.

Examples of suitable wetting agents are siloxanes, fluorine compounds, carboxylic monoesters, phosphoric esters, polyacrylic acids and their copolymers, or polyurethanes.

An example of a suitable adhesion promoter is tricyclodecanedimethanol.

Examples of suitable of film-forming auxiliaries are cellulose derivatives such as cellulose acetobutyrate (CAB).

Examples of suitable transparent fillers and/or nanoparticles are those based on silica, alumina or zirconium oxide; for further details, reference is made to Römpp Lexikon Lacke und Druckfarben, Georg Thieme Verlag, Stuttgart, 1998, pages 250 to 252.

Examples of suitable sag control agents are ureas, modified ureas and/or silicas, as described, for example, in the literature references EP 0 192 304 A1, DE 23 59 923 A1, DE 18 05 693 A1, WO 94/22968, DE 27 51 761 C1, WO 97/12945 or "farbe+lack", 11/1992, pages 829 ff.

Examples of suitable rheology control additives are those known from patents WO 94/22968, EP 0 276 501 A1, EP 0 249 201 A1 or WO 97/12945; crosslinked polymeric microparticles, as disclosed, for example, in EP 0 008 127 A1; inorganic phyllosilicates such as aluminum-magnesium silicates, sodium-magnesium and sodium-magnesium-fluorine-lithium phyllosilicates of the montmorillonite type; silicas such as Aerosils; or synthetic polymers containing ionic and/or associative groups, such as polyvinyl alcohol, poly(meth)acrylamide, poly(meth)acrylic acid, polyvinylpyrrolidone, styrene-maleic anhydride or ethylene-maleic anhydride copolymers and their derivatives, or hydrophobically modified ethoxylated urethanes or polyacrylates.

An example of a suitable flatting agent is magnesium stearate.

Examples of suitable precursors of organically modified ceramic materials are hydrolyzable organometallic compounds, especially those of silicon and aluminum.

Further examples of the abovementioned additives and also examples of suitable UV absorbers, free-radical scavengers, leveling agents, flame retardants, siccatives, dryers, antiskinning agents, corrosion inhibitors and waxes are described in detail in the text book "Lackadditive" by Johan Bieleman, Wiley-VCH, Weinheim, New York, 1998.

The isocyanate-reactive binder component (A) for use in accordance with the invention may itself be present in the form of a multicomponent system, i.e., with its constituents as described above being stored separately from one another until use. For example, the binders (A1) may be stored separately from the binders (A2) and/or (A3). In accordance with the invention, however, it is of advantage to collect together all constituents in an isocyanate-reactive binder component (A). Where the crosslinker component (B) likewise forms a component in the above sense, this results in the two-component system of the invention.

Viewed in terms of its method, the preparation of the isocyanate-reactive binder component (A) for use in accordance with the invention has no special features but instead takes place with the aid of the customary and known apparatus and techniques for the preparation of powder coating materials, powder slurries, liquid 100% systems, aqueous coating materials or conventional coating materials, using customary and known mixing equipment such as stirred vessels, dissolvers, including in-line dissolvers, toothed-wheel dispersers, stirred mills, or extruders.

The other constituent of the multicomponent system of the invention that is essential to the invention is at least one crosslinker component (B).

The crosslinker component comprises at least one polyisocyanate (B1).

There is basically no upper limit on the number of isocyanate groups in the polyisocyanates (B1); in accordance with the invention, however, it is of advantage if the number does not exceed 15, preferably 12, with particular preference 10, with very particular preference 8.0, and in particular 6.0.

Examples of suitable polyisocyanates (B1) are polyurethane prepolymers which contain isocyanate groups, may be prepared by reacting polyols with an excess of preferably aliphatic and cycloaliphatic diisocyanates, and are preferably of low viscosity. In the context of the present invention, the term "cycloaliphatic diisocyanate" refers to a diisocyanate in which at least one isocyanate group is attached to a cycloaliphatic radical.

Examples of suitable cycloaliphatic diisocyanates are isophorone diisocyanate (i.e., 5-isocyanato-1-isocyanatomethyl-1,3,3-trimethylcyclohexane), 5-isocyanato-1-(2-isocyanatoeth-1-yl)-1,3,3-trimethylcyclohexane, 5-isocyanato-1-(3-isocyanatoprop-1-yl)-1,3,3-trimethylcyclohexane, 5-isocyanato-(4-isocyanatobut-1-yl)-1,3,3-trimethylcyclohexane, 1-isocyanato-2-(3-isocyanatoprop-1-yl)cyclohexane, 1-isocyanato-2-(3-isocyanatoeth-1-yl)cyclohexane, 1-isocyanato-2-(4-isocyanatobut-1-yl)cyclohexane, 1,2-diisocyanatocyclobutane, 1,3-diisocyanatocyclobutane, 1,2-diisocyanatocyclopentane, 1,3-diisocyanatocyclopentane, 1,2-diisocyanatocyclohexane, 1,3-diisocyanatocyclohexane, 1,4-diisocyanatocyclohexane, dicyclohexylmethane 2,4'-diisocyanate or dicyclohexylmethane 4,4'-diisocyanate, especially isophorone diisocyanate.

Examples of suitable acyclic aliphatic diisocyanates are trimethylene diisocyanate, tetramethylene diisocyanate, pentamethylene diisocyanate, hexamethylene diisocyanate, ethyl ethylene diisocyanate, trimethylhexane diisocyanate, heptanemethylene diisocyanate or diisocyanates derived from dimeric fatty acids, as marketed by Henkel under the commercial designation DDI 1410 and described in patents WO 97/49745 and WO 97/49747, especially 2-heptyl-3,4-bis(9-isocyanatononyl)-1-pentylcyclohexane, or 1,2-, 1,4- or 1,3-bis-(isocyanatomethyl)cyclohexane, 1,2-, 1,4- or 1,3-bis(2-isocyanatoeth-1-yl)cyclohexane, 1,3-bis(3-isocyanatoprop-1-yl)cyclohexane or 1,2-, 1,4- or 1,3-bis(4-isocyanatobut-1-yl)cyclohexane.

Of these, hexamethylene diisocyanate is of particular advantage and is therefore used with very particular preference in accordance with the invention.

It is also possible to use polyisocyanates (B1) containing isocyanurate, biuret, allophanate, iminooxadiazinedione, urethane, urea, carbodiimide and/or uretdione groups, these polyisocyanates being prepared in customary and known manner from the diisocyanates described above. Examples of suitable preparation processes and polyisocyanates are known, for example, from patents and patent applications CA 2,163,591 A, U.S. Pat. Nos. 4,419,513 A, 4,454,317 A, EP 0 646, 608 A1, U.S. Pat. No. 4,801,675 A, EP 0 183 976 A1, DE 40 15 155 A1, EP 0 303 150 A1, EP 0 496 208 A1, EP 0 524 500 A1, EP 0 566 037 A1, U.S. Pat. Nos. 5,258,482 A, 5,290,902 A, EP 0 649 806 A1, DE 42 29 183 A1, and EP 0 531 820 A1.

Instead of or in addition to the polyisocyanates (B1), the crosslinker component (B) for use in accordance with the invention contains at least one polyisocyanate (B2) whose molecule comprises on average at least one, preferably at least two, of the above-described radiation-active groups.

The polyisocyanates (B2) are obtainable by reacting the above-described polyisocyanates (B1) with compounds containing at least one, especially one, of the above-described bonds that can be activated with actinic radiation and at least one, especially one, of the above-described isocyanate-reactive groups.

Examples of suitable compounds which contain at least one bond that can be activated with actinic radiation and at least one isocyanate-reactive group are the following:

allyl alcohol or 4-butyl vinyl ether;

hydroxyalkyl esters of acrylic acid or methacrylic acid, especially of acrylic acid, obtainable by esterifying aliphatic diols of acrylic acid or methacrylic acid or by reacting acrylic acid or methacrylic acid with an alkylene oxide, especially hydroxyalkyl esters of acrylic acid or methacrylic acid in which the hydroxyalkyl group contains up to 20 carbon atoms, such as 2-hydroxyethyl, 2-hydroxypropyl, 3-hydroxypropyl, 3-hydroxybutyl, 4-hydroxybutyl, and bis(hydroxymethyl)cyclohexane acrylate or methacrylate; of these, 2-hydroxyethyl acrylate and 4-hydroxybutyl acrylate are particularly advantageous and are therefore used with particular preference in accordance with the invention; or reaction products of cyclic esters, such as epsilon-caprolactone, for example, and these hydroxyalkyl or hydroxycycloalkyl esters.

The polyisocyanates (B1) are reacted with the compounds containing at least one bond that can be activated with actinic radiation and at least one isocyanate-reactive group in a molar ratio such that on average at least one free isocyanate group remains per molecule.

Viewed in terms of method, this reaction has no special features but instead takes place as described, for example, in European Patent EP 0 928 800 A1.

In accordance with the invention it is of advantage to use the polyisocyanates (B2) in the multicomponent systems of the invention, since the systems are then able to participate in the dual cure curing mechanism.

The crosslinker component (B) may further comprise at least one of the above-described additives, provided it is not isocyanate-reactive. It is preferred to use inert organic solvents if the viscosity of the crosslinker component (B) is to be altered specifically, especially if it is to be reduced, in order to facilitate its incorporation into the binder component (A).

The amount of the polyisocyanates (B1) and/or (B2) for use in accordance with the invention in the multicomponent systems of the invention may vary very widely. It is guided in particular by the functionality and the amount of the isocyanate-reactive binder component (A). The amount is preferably from 1 to 50, more preferably from 2 to 45, with particular preference from 3 to 40, with very particular preference from 4 to 35, and in particular from 5 to 30% by weight, based in each case on the solids of the multicomponent system of the invention.

The preparation of the multicomponent system of the invention from the isocyanate-reactive binder component (A) and the crosslinker component (B) also has no special features as to method but instead takes place in accordance with the customary and known methods, for example, by manual mixing or mechanical mixing in suitable mixing equipment such as stirred vessels, toothed-gear dispersers or homogenizing nozzles.

Although the multicomponent systems of the invention are suitable for all applications in the fields of coating, especially in OEM automotive finishing, in automotive refinishing, in the coating of interior and exterior constructions, in the coating of furniture, doors, or windows, in industrial coating, including coil coating and container coating, and in the coating on and/or impregnation of electrical components, in which they may be used to produce primer coats, surfacer coats, color and/or effect topcoats and basecoats or clearcoats, they develop their particular advantages in connection with the priming of plastics parts.

The plastics parts may be of plastic such as ABS, AMMA, ASA, CA, CAB, EP, UF, CF, MF, MPF, PF, PAN, PA, PE, HDPE, LDPE, LLDPE, UHMWPE, PET, PMMA, PP, PS, SB, PUR, PVC, RF, SAN, PBT, PPE, PPE/PS, PA, PPE/PA, POM, PUR-RIM, SMC, BMC, PP-EPDM and UP (abbreviations in accordance with DIN 7728P1), polymer blends thereof or the corresponding glass fiber reinforced or carbon fiber reinforced plastics. Preferably, plastics parts as commonly used in motor vehicle bodywork construction are coated or primed with the multicomponent systems of the invention.

The application of the multicomponent system of the invention may take place by all customary application methods, such as spraying, knife coating, brushing, flow coating, dipping, impregnating, trickling or roller coating. The substrate to be coated may per se be at rest, with the application equipment or unit being moved. Alternatively, the substrate to be coated, especially a coil, may be moved, with the application unit being at rest relative to the substrate or being moved in an appropriate manner.

Preference is given to the use of spray application methods, such as compressed air spraying, airless spraying, high-speed rotation, or electrostatic spray application (ESTA), for example.

Application is preferably conducted under illumination with visible light of a wavelength of more than 550 $\mu$m or in the absence of light. This prevents material changes or damage to the multicomponent system of the invention.

In general, the multicomponent system of the invention is applied in a wet film thickness such that curing thereof results in primer coats having the thicknesses advantageous and necessary for their functions. The coat thicknesses are preferably from 5 to 100, more preferably from 6 to 90, with particular preference from 7 to 80, with very particular preference from 8 to 70, and in particular from 9 to 60 μm.

In the context of the process of the invention, the film of the multicomponent system of the invention, following its application, is cured thermally and with actinic radiation.

In the context of the process of the invention, curing may take place directly after the application of the film of the multicomponent system of the invention.

Alternatively, curing may take place after a certain resting time or flashoff time. Such a time may last for from 30 s to 2 h, preferably from 1 min to 1 h, and in particular from 1 min to 45 min. The resting time is used, for example, for the leveling and degassing of the films and for the evaporation of volatile constituents such as any solvent still present.

In the case of curing with actinic radiation, it is preferred to employ a dose of from 1000 to 3000, preferably from 1100 to 2900, with particular preference from 1200 to 2800, with very particular preference from 1300 to 2700, and in particular from 1400 to 2600 mJ/cm². If desired, this curing may be supplemented by actinic radiation from other radiation sources. In the case of electron beams, it is preferred to operate under an inert gas atmosphere. This can be ensured, for example, by supplying carbon dioxide and/or nitrogen directly to the surface of the film. In the case of curing with UV radiation, as well, it is possible to operate under inert gas in order to prevent the formation of ozone.

Curing with actinic radiation is carried out using the customary and known radiation sources and optical auxiliary measures. Examples of suitable radiation sources are flashlights from the company VISIT, high-pressure or low-pressure mercury vapor lamps, with or without lead doping in order to open a radiation window of up to 405 nm, or electron beam sources. The arrangement of these sources is known in principle and may be adapted to the circumstances of the workpiece and the process parameters. In the case of workpieces of complex shape, as are provided for automobile bodies, those regions not accessible to direct radiation (shadow regions), such as cavities, folds and other structural undercuts, may be cured using point, small-area or all-round emitters, in combination with an automatic movement apparatus for the irradiation of cavities or edges.

The equipment and conditions for these curing methods are described, for example, in R. Holmes, U.V. and E.B. Curing Formulations for Printing Inks, Coatings and Paints, SITA Technology, Academic Press, London, United Kingdom, 1984.

Full curing may take place here in stages, i.e., by multiple exposure to light or actinic radiation. It can also take place in alternation, in other words, by curing alternately with UV radiation and electron beams.

Thermal curing also has no special features in terms of its method but instead takes place in accordance with the customary and known methods such as heating in a convection oven or irradiation with IR or NIR lamps. As in the case of curing with actinic radiation, thermal curing may also take place in stages. Advantageously, thermal curing takes place at temperatures below 100° C., preferably 90° C. With particular preference, thermal curing is conducted at between 40 and 80° C.

Thermal curing and curing with actinic radiation are employed simultaneously or in succession. If the two curing methods are used in succession, it is possible, for example, to commence with thermal curing and end with actinic radiation curing. In other cases, it may prove advantageous to commence and to end with actinic radiation curing.

If desired, the dual cure may also be supplemented, or terminated, by storage under hot conditions, for example, at from 40 to 80° C. for an hour or for up to several days.

The particularly advantageous properties of the multicomponent system of the invention permit transit speeds of 10 m/min or more. Owing to the mild conditions which can be employed for curing, primer coats in automotive class A surface quality are obtained despite high productivity. Following their mounting on the motor vehicle bodies, immediately or after storage for any period of time, the mounted plastics parts primed in accordance with the invention withstand all customary processes of automotive coating, such as electrodeposition coating or coating with surfacers, basecoats, clearcoats or solid-color topcoats.

The fully painted mounted plastics parts primed in accordance with the invention have an outstanding surface and also excellent optical properties. The adhesion of the primer of the invention to the plastics surface, on the one hand, and to the coating present on it, on the other, is outstanding. The mounted plastics parts primed in accordance with the invention therefore meet all of the requirements of modern motor vehicle painting.

EXAMPLES

Preparation Example 1

The Preparation of the Monocarboxylic Acid (VII)

A stirring flask with heating system and reflux condenser was charged with the following:

710.81 g of dicyclopentadiene (93 percent) (5.0 mol) and 490.30 g of maleic anhydride (5.0 mol).

The mixture was heated to 125° C. under a gentle stream of nitrogen. Subsequently,

| 95.00 g of water | (5.0 mol + 5 g) | were added from a dropping funnel over the course of one hour. Reaction was allowed to continue at 125° C. for one hour. The monocarboxylic acid (VII) was formed:

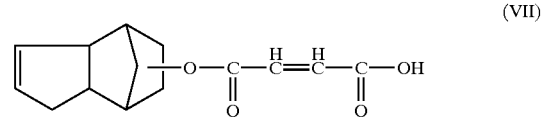

(VII)

Preparation Example 2

The Preparation of Polyester (A1) for Use in Accordance with the Invention

A stirring flask equipped with heating system and top-mounted distillation unit was charged with the following starting compounds:

315.00 g of triethylene glycol (2.1 mol),
134.00 g of diethylene glycol monoethyl ether (1 mol),
516.80 g of the monocarboxylic acid (VII) of Preparation Example 1 (2 mol),
156.60 g of fumaric acid (1.35 mol),
87.36 g of di(ethylhexyl) benzophenonetetracarboxylate (0.15 mol),
4.00 g of Fascat® 4201 (commercial esterification catalyst), and
0.50 g of hydroquinone.

The reaction mixture was heated rapidly to 130° C. under a gentle stream of nitrogen. Subsequently, the temperature was raised gradually to 190° C. over the course of 4.5 hours. During this time, the water of condensation formed was removed by distillation.

This gave a liquid polyester (A1) having an acid number of 9.7 mg KOH/g, a hydroxyl number of 59 mg KOH/g and a viscosity and 7220 mPas at 25° C.

Preparation Example 3
The Preparation of a Polyester (A1) for Use in Accordance with the Invention, Having Enhanced Flexibility A stirring flask equipped with heating system and top-mounted distillation unit was charged with the following starting compounds:
1441.5 g of maleic anhydride (17.7 mol),
546.6 g of Imidol 6 (diethanolamine maleimide) (2.8 mol), and
56 g of water (3.1 mol).

The initial charge was heated to 90° C., whereupon an exothermic reaction took place.

Immediately thereafter, the feed stream 1 (398 g of dicyclopentadiene, 93 percent, 2.8 mol) was metered in to the initial charge at from 116 to 128° C. over the course of 30 minutes. The resulting mixture was held at 125° C. for one hour.

Thereafter, the heating system was removed and a mixture consisting of
491.0 g of castor oil (hydroxyl number: 160 mg KOH/g),
1040.0 g of 2-methyl-1,3-propanediol (11.58 mol), and
7.4 g of Fascat® 4201
was incorporated by stirring. The resulting reaction mixture was heated rapidly to 130° C. under a gentle stream of nitrogen. Then the temperature was raised gradually to 190° C. over the course of 6 hours, during which the water of condensation formed was removed by distillation.

This gave a liquid polyester (A1) having an acid number of 7.8 mg KOH/g and a hydroxyl number of 92 mg KOH/g and a viscosity of 224 Pas at 25° C.

Example 1
The Preparation of Two-component System of the Invention

The binder component (A) was prepared by mixing the constituents indicated below, in the stated order, in a high-speed dissolver:
50 parts by weight of styrene,
36 parts by weight of the polyester (A1) of Preparation Example 2,
22 parts by weight of Ebecryl® IRR 351 [(A3); commercial hydroxyl-containing polyurethane acrylate from UCB],
12 parts by weight of Talkum AT,
16.4 parts by weight of dolomite,
10 parts by weight of Dental® W 500 (commercial, electrically conductive titanium dioxide/tin oxide pigment from Otosuka Ltd.),
0.4 part by weight of Irgacure® 184 (commercial photoinitiator),
4 parts by weight of Aerosil® 200 gel (commercial pyrogenic silica, 10 percent in styrene),
6 parts by weight of Bentone® gel (commercial bentonite, 10 percent in styrene),
0.2 part by weight of Disparlon® LC 900 (commercial wetting agent from Kosumoto Ltd.), and
0.4 part by weight of Nuodex® Li (commercial catalyst for thermal crosslinking NCO/OH).

The resulting binder component (A) was completely stable on storage.

The binder component (A) was mixed with 27 parts by weight of the commercial polyisocyanate Roskydal® 2337 from Bayer AG (B2), which contained acrylate groups.

The resulting two-component system of the invention had a pot life or processing time of more than 36 hours. Nevertheless, it was fully cured by irradiation with UV light within five minutes following its pneumatic application with a gravity-feed gun to plastics parts at 60° C. This gave primer coats of the invention having a dry thickness of 30 μm. These coats had an outstanding, smooth surface and outstanding adhesion to the plastics surfaces. Moreover, they could be painted over without problems. The intercoat adhesion was likewise outstanding.

Example 2
The Preparation of a Two-component System of the Invention

The binder component (A) was prepared by mixing the constituents indicated below, in the stated order, in a high-speed dissolver:
50 parts by weight of hexanediol diacrylate,
42 parts by weight of the polyester (A1) of Preparation Example 3,
17 parts by weight of Ebecryl® IRR 351 [(A3); commercial hydroxyl-containing polyurethane acrylate from UCB],
12 parts by weight of Talkum AT,
16.4 parts by weight of dolomite,
10 parts by weight of Dental® W 500 (commercial, electrically conductive titanium dioxide/tin oxide pigment from Otosuka Ltd.),
1.9 parts by weight of Irgacure® 1850 (commercial photoinitiator),
4.5 parts by weight of Aerosil® 200 gel (commercial pyrogenic silica, 10 percent in styrene),
5.5 parts by weight of Bentone® gel (commercial bentonite, 10 percent in styrene),
0.3 part by weight of Disparlon® LC 900 (commercial wetting agent from Kosumoto Ltd.), and
0.4 part by weight of Nuodex® Li (commercial catalyst for thermal crosslinking NCO/OH).

The resulting binder component (A) was completely stable on storage.

The binder component (A) was mixed with 31 parts by weight of the commercial polyisocyanate Roskydal® 2337 from Bayer AG (B2), which contained acrylate groups.

The resulting two-component system of the invention likewise had a pot life or processing time of more than 36 hours. Nevertheless, it was fully cured by irradiation with UV light within 6 minutes following its pneumatic application with a gravity-feed gun to plastics parts at 60° C. This gave primer coats of the invention having a dry thickness of 55 μm. These coats had an outstanding, smooth surface and outstanding adhesion to the plastics surfaces. Moreover, they could be painted over without problems. The intercoat adhesion was likewise outstanding.

What is claimed is:

1. A multicomponent system curable thermally and with actinic radiation, comprising A) an isocyanate-reactive binder component comprising
A1) at least one unsaturated polyester whose molecule contains on average at least one group that can be activated with actinic radiation that is at least one of formula I, formula II, and formula III

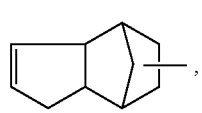
(I)

-continued

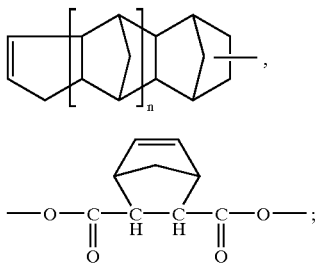

wherein n is an integer from 1 to 10, and at least one of
- A2) at least one binder, different than the polyester (A1), whose molecule comprises on average at least two isocyanate-reactive functional groups, and
- A3) at least one binder, different than the polyester (A1), whose molecule comprises on average at least one isocyanate-reactive functional group and at least one reactive functional group having at least one bond that can be activated with actinic radiation; and B) a crosslinker component comprising at least one of
- B1) at least one polyisocyanate, and
- B2) at least one polyisocyanate whose molecule comprises on average at least one reactive functional group having at least one bond that can be activated with actinic radiation.

2. The multicomponent system of claim 1, wherein the isocyanate-reactive binder component comprises at least one reactive diluent that is curable thermally.

3. The multicomponent system of claim 1, wherein at least one of the isocyanate-reactive binder component and the crosslinker component comprise at least one reactive diluent that can be activated with actinic radiation.

4. The multicomponent system of claim 1, wherein the bonds that can be activated with actinic radiation comprise at least one of carbon-hydrogen single bonds, carbon-carbon single bonds, carbon-oxygen single bonds, carbon-nitrogen single bonds, carbon-phosphorus single bonds, carbon-silicon single bonds, carbon-carbon double bonds, carbon-oxygen double bonds, carbon-nitrogen double bonds, carbon-phosphorus double bonds, and carbon-silicon double bonds.

5. The multicomponent system of claim 1, wherein the bonds that can be activated with actinic radiation comprise carbon-carbon double bonds.

6. The multicomponent system of claim 5, wherein the carbon-carbon double bonds are present in at least one of a (meth)acrylate allyl group, an ethacrylate allyl group, a crotonate allyl group, a cinnamate allyl group, a vinyl ether allyl group, a vinyl ester allyl group, a dicyclopentadienyl allyl group, a norbornenyl allyl group, an isoprenyl allyl group, an isoprenyl allyl group, an isopropenyl allyl group, a (meth)acrylate butenyl group, an ethacrylate butenyl group, a crotonate butenyl group, a cinnamate butenyl group, a vinyl ether butenyl group, a vinyl ester butenyl group, a dicyclopentadienyl butenyl group, a norbornenyl butenyl group, an isoprenyl butenyl group, an isoprenyl butenyl group, an isopropenyl butenyl group, a dicyclopentadienyl allyl ether group, a norbornenyl allyl ether group, an isoprenyl allyl ether group, an isopropenyl allyl ether group, a dicyclopentadienyl butenyl ether group, a norbornenyl butenyl ether group, an isoprenyl butenyl ether group, an isopropenyl butenyl ether group, a dicyclopentadienyl allyl ester group, a norbornenyl allyl ester group, an isoprenyl allyl ester group, an isopropenyl allyl ester group, a dicyclopentadienyl butenyl ester group, a norbornenyl butenyl ester group, an isoprenyl butenyl ester group, and an isopropenyl butenyl ester group.

7. The multicomponent system of claim 1, wherein the isocyanate-reactive functional group is at least one of hydroxyl, amino, and thiol.

8. The multicomponent system of claim 1, wherein the isocyanate-reactive functional group is hydroxyl.

9. The multicomponent system of claim 1 further comprising at least one platelet-shaped inorganic filler and at least one nonplatelet-shaped inorganic filler.

10. The multicomponent system of claim 1 further comprising at least one of i) at least one electrically conductive pigment, and ii) at least one electrically conductive filler.

11. A method comprising applying the multicomponent system of claim 1 as a primer to a plastic part.

12. The method of claim 11, wherein the plastic part comprises at least one of a motor vehicle body and a part for a motor vehicle.

* * * * *